(12) United States Patent
Chory et al.

(10) Patent No.: US 11,280,397 B2
(45) Date of Patent: Mar. 22, 2022

(54) METHOD OF RETROFITTING A GEAR BOX ASSEMBLY WITH AN EMERGENCY LUBRICATION SYSTEM

(71) Applicant: Sikorsky Aircraft Corporation, Stratford, CT (US)

(72) Inventors: Anthony G. Chory, Trumbull, CT (US); Erin Carter, Wallingford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 296 days.

(21) Appl. No.: 16/400,399

(22) Filed: May 1, 2019

(65) Prior Publication Data
US 2019/0257407 A1    Aug. 22, 2019

Related U.S. Application Data

(62) Division of application No. 15/223,731, filed on Jul. 29, 2016, now abandoned.

(60) Provisional application No. 62/204,128, filed on Aug. 12, 2015.

(51) Int. Cl.
| F16H 57/04 | (2010.01) |
|---|---|
| F16H 57/027 | (2012.01) |
| F16H 57/02 | (2012.01) |
| B64C 27/14 | (2006.01) |
| B64C 27/12 | (2006.01) |

(52) U.S. Cl.
CPC ....... *F16H 57/0435* (2013.01); *F16H 57/045* (2013.01); *F16H 57/0442* (2013.01); *F16H 57/0458* (2013.01); *B64C 27/12* (2013.01); *B64C 27/14* (2013.01); *F16H 57/027* (2013.01); *F16H 57/0438* (2013.01); *F16H 57/0439* (2013.01); *F16H 57/0495* (2013.01); *F16H 2057/02026* (2013.01)

(58) Field of Classification Search
CPC ........ F16N 37/00; F16N 39/08; F16H 57/045; F16H 57/0456; F16H 57/0442; F01M 2011/0095; F01M 9/02; F01M 2001/1014
See application file for complete search history.

(56) References Cited

U.S. PATENT DOCUMENTS

| 3,786,901 A | 1/1974 | Randell |
| 5,121,815 A | 6/1992 | Francois et al. |
| 5,344,101 A | 9/1994 | Francois |
| 5,509,949 A | 4/1996 | Gluys et al. |
| 5,894,825 A * | 4/1999 | Duerr ...................... F01M 1/02 123/196 S |
| 7,137,590 B2 | 11/2006 | Sandrart et al. |
| 7,500,542 B2 | 3/2009 | Maret et al. |
| 8,529,657 B2 | 9/2013 | Kincaid et al. |
| 9,624,798 B2 * | 4/2017 | Mullen .................. F16N 39/00 |
| 10,012,305 B2 | 7/2018 | Louis |
| 10,746,284 B2 * | 8/2020 | Gmirya .............. F16H 57/0456 |

(Continued)

*Primary Examiner* — Minh Truong
(74) *Attorney, Agent, or Firm* — Michael Best & Friedrich LLP (57) ABSTRACT

A method of retrofitting a gear box assembly with an emergency lubrication system includes removing plugs from visual inspection ports of a gearbox housing, removing a breather from a breather port of the gearbox housing, and installing jet plugs into the respective visual inspection ports and breather port, wherein each jet plug includes a respective jet tube.

8 Claims, 5 Drawing Sheets

(56) References Cited

U.S. PATENT DOCUMENTS

| | | |
|---|---|---|
| 2002/0195296 A1 | 12/2002 | Maret et al. |
| 2009/0071753 A1 | 3/2009 | Carnelli et al. |
| 2011/0036200 A1* | 2/2011 | Curtis ................. F16H 57/0447 |
| | | 74/606 R |
| 2011/0150655 A1* | 6/2011 | Tietze .................... F03D 80/70 |
| | | 416/170 R |
| 2011/0297484 A1* | 12/2011 | Williams, Jr. ............ F16N 7/38 |
| | | 184/6.1 |
| 2012/0227820 A1 | 9/2012 | Poster |
| 2012/0247874 A1 | 10/2012 | Poster et al. |
| 2014/0001307 A1 | 1/2014 | Ehinger et al. |
| 2016/0025206 A1 | 1/2016 | Modrzejewski et al. |
| 2016/0046151 A1* | 2/2016 | Kelly ...................... B60R 1/002 |
| | | 74/607 |
| 2018/0223984 A1 | 8/2018 | Dziuba et al. |

* cited by examiner

METHOD OF RETROFITTING A GEAR BOX ASSEMBLY WITH AN EMERGENCY LUBRICATION SYSTEM

CROSS-REFERENCE TO RELATED APPLICATIONS

This application is a divisional of U.S. application Ser. No. 15/223,731 filed on Jul. 29, 2016, and claims benefit of priority under 35 U.S.C. § 119(e) to U.S. Provisional Application No. 62/204,128, filed Aug. 12, 2015, which are incorporated herein by reference in their entirety.

BACKGROUND OF THE INVENTION

1. Field of the Invention

The present disclosure relates to transmissions, and more particularly to lubrication systems for mechanical power transmissions.

2. Description of Related Art

Rotorcraft transmissions commonly include transmission elements like gears and bearings that transmit rotational power through the transmission. Because these elements can be subject to heating and wear from friction while transmitting rotational power, rotorcraft transmissions typically include lubrication systems for supplying lubricant to the transmission components. Such lubrication systems generally irrigate the transmission components with a continuous flow of lubricant. This allows the transmission to transmit mechanical power while limiting heat and wear from friction between transmission components.

In some rotorcraft transmissions, operation under reduced lubricant flow conditions can accelerate transmission component wear. Aircraft certification bodies like the Federal Aviation Administration (FAA) therefore generally require that rotorcraft transmissions be able to operate for a minimum period of time with reduced or no lubricant flow—typically for at least thirty (30) minutes—under oil-out conditions. Transmissions may employ various elements to satisfy these requirements, such as additive injection, lubricant misting, glycol-based cooling, or supplemental lubrication circuits.

Such conventional lubrication methods and lubrication systems have generally been considered satisfactory for their intended purpose. However, there is still a need in the art for improved lubrication methods and lubrication systems. The present disclosure provides a solution for this need.

SUMMARY OF THE INVENTION

Disclosed is a method of retrofitting a gear box assembly with an emergency lubrication system includes removing plugs from visual inspection ports of a gearbox housing, removing a breather from a breather port of the gearbox housing, and installing jet plugs into the respective visual inspection ports and breather port, wherein each jet plug includes a respective jet tube.

These and other features of the systems and methods of the subject disclosure will become more readily apparent to those skilled in the art from the following detailed description of the preferred embodiments taken in conjunction with the drawings.

In addition to one or more of the features described above, or as an alternative, according to one embodiment of the invention, a method of retrofitting a gear box assembly with an emergency lubrication system, comprising: removing plugs from visual inspection ports of a gearbox housing; removing a breather from a breather port of the gearbox housing; and installing jet plugs into the respective visual inspection ports and breather port, wherein each jet plug includes a respective jet tube.

In addition to one or more of the features described above, or as an alternative, further comprising: removing nuts and washers from screws of an accessory module of a gear box assembly; installing a first emergency lubrication reservoir by mating the screws on the accessory module with holes on a first reservoir mount; installing a second emergency lubrication reservoir, wherein the second emergency lubrication reservoir includes a pump, by mating the screws on the accessory module with holes on a second reservoir mount; securing the first and second emergency lubrication reservoirs onto the accessory module; and installing lubrication lines between the jet tubes of the breather port and inspection ports to at least one of the first and second emergency lubrication reservoirs.

In addition to one or more of the features described above, or as an alternative, further comprising wiring an AC power source to the pump.

In addition to one or more of the features described above, or as an alternative, further comprising installing a switch operatively connected to the pump, and wiring an AC power source to the switch.

In addition to one or more of the features described above, or as an alternative, further comprising securing the lubrication lines to the gearbox housing.

In addition to one or more of the features described above, or as an alternative, further comprising orienting the jet tubes to point at desired transmission components.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
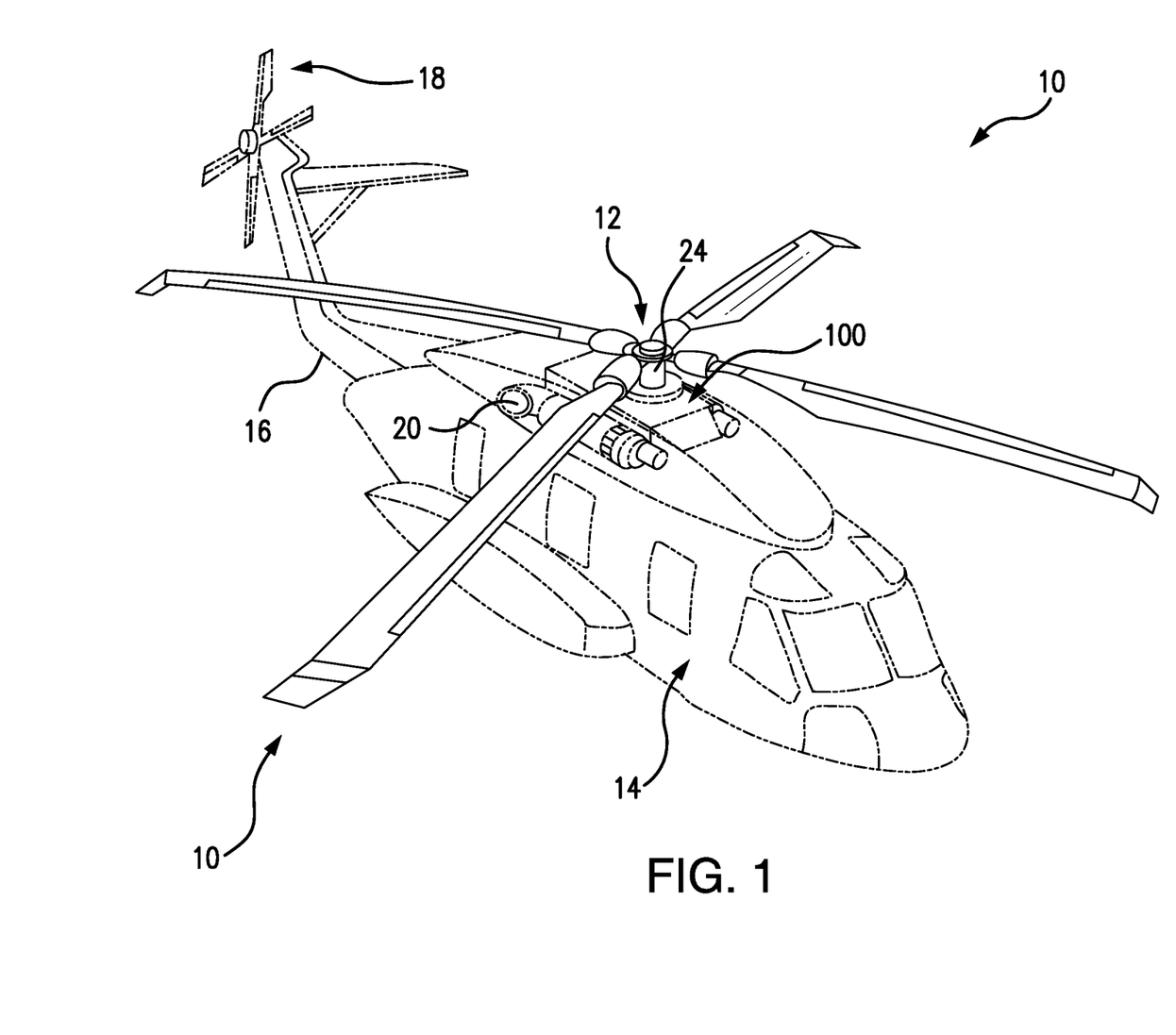
FIG. 1 is a perspective view of an exemplary embodiment of a rotorcraft constructed in accordance with the present disclosure, schematically showing a gearbox assembly.

Reference will now be made to the drawings wherein like reference numerals identify similar structural features or aspects of the subject disclosure. For purposes of explanation and illustration, and not limitation, a partial view of an exemplary embodiment of a gearbox assembly in accordance with the disclosure is shown in FIG. 1 and is designated generally by reference character 100. Other embodiments of gearbox assemblies, emergency lubrication systems, and methods of retrofitting gearbox assemblies in accordance with the disclosure, or aspects thereof, are provided in FIGS. 2-6, as will be described. The systems and methods described herein can be used in vehicular applications, such as in aircraft.

Referring now to FIG. 1, an exemplary rotorcraft 10 is shown. Rotorcraft 10 includes a main rotor system 12 and an airframe 14. Airframe 14 includes a longitudinally extending tail 16 with a tail rotor system 18, at least one engine 20, and a gearbox assembly 100. Engines 20 are operatively connected to main rotor system 12 and tail rotor system 18 through gearbox assembly 100, and are configured to supply rotational energy to both main rotor system 12 through a main rotor shaft 24 and tail rotor system 18 through gearbox assembly 100. Although a particular rotorcraft configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
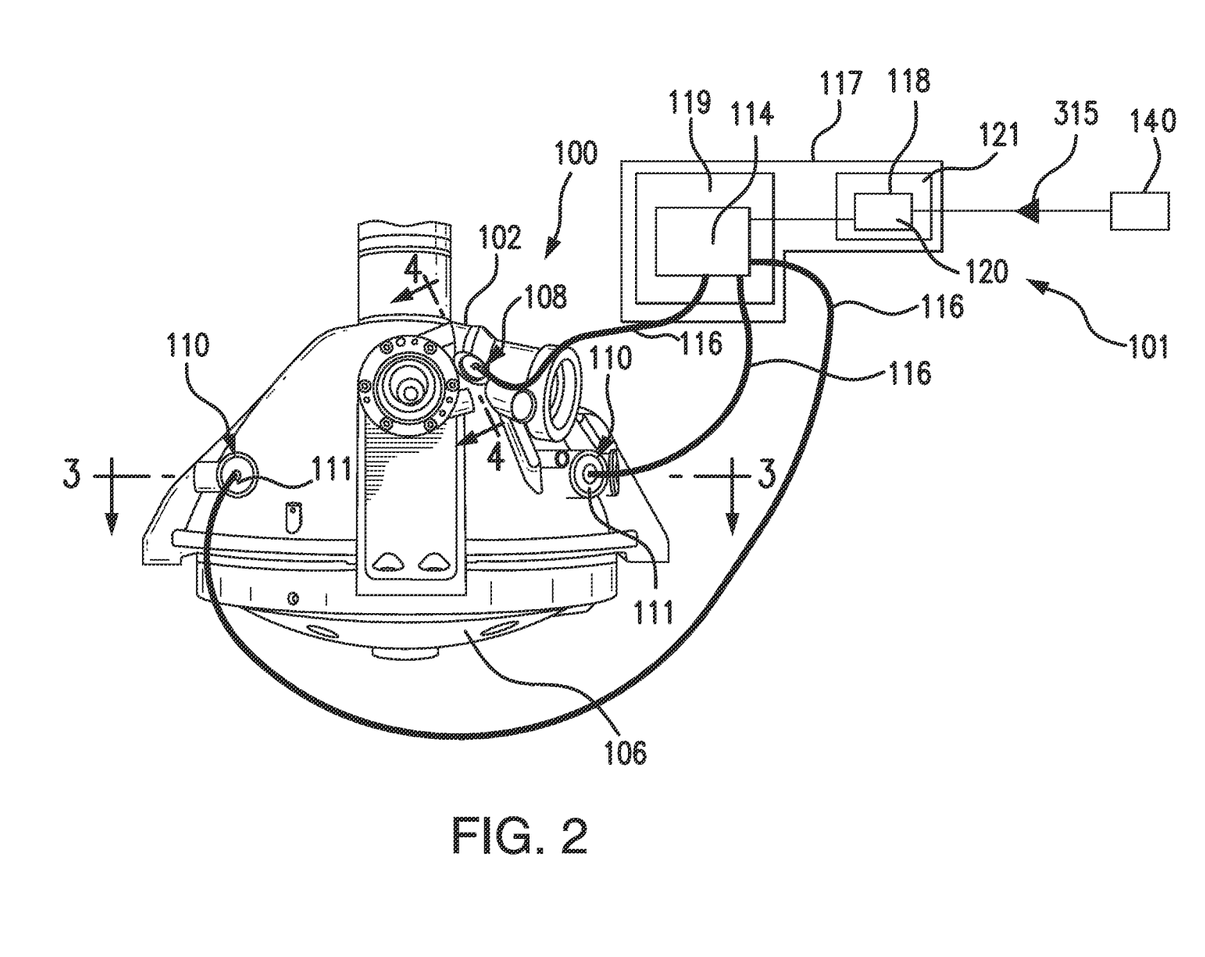
FIG. 2 is a side elevation view of the gearbox assembly of FIG. 1, schematically showing the breather port and the visual inspection ports.
Figure 3:
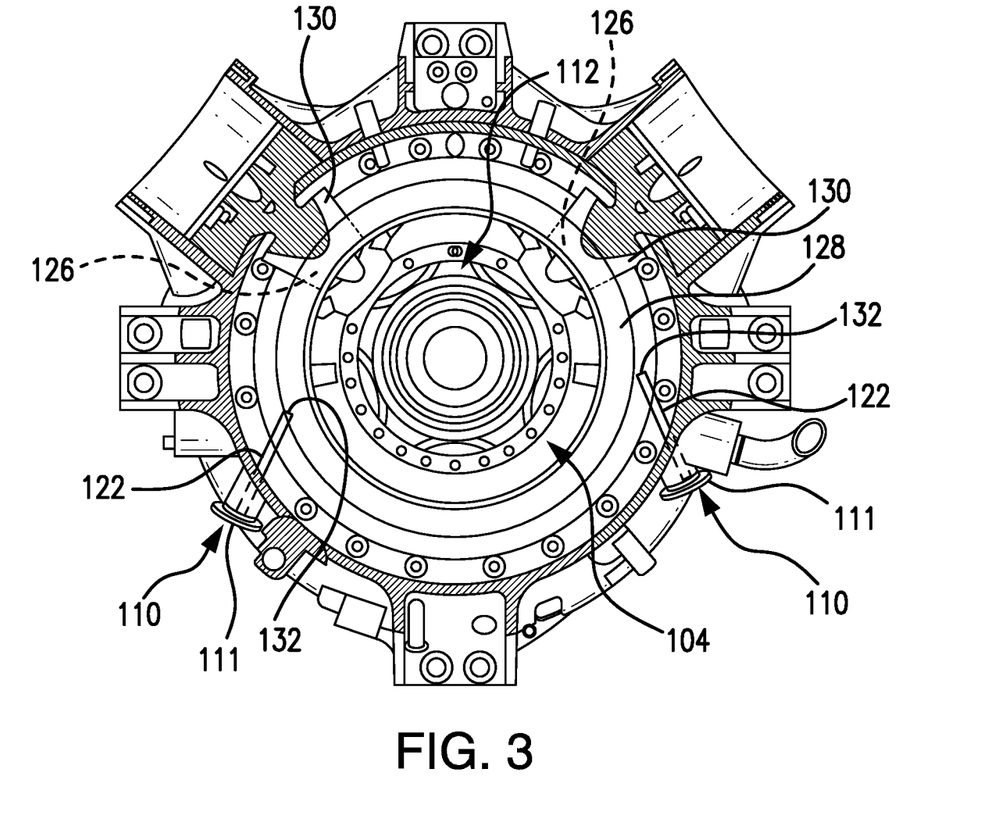
FIG. 3 is a plan view of the gearbox assembly of FIG. 1, showing an exemplary embodiment of jet tubes directed toward the main bevel gear mesh.

As shown in FIGS. 2 and 3, gearbox assembly 100 includes a regular operation lubrication system (not shown) which provides lubrication to the gearbox assembly 100 during normal operation, and an emergency lubrication system 101 which provides lubrication when the regular operation lubrication system breaks down or is unable to provide the needed lubrication. Gearbox assembly 100 has a housing 102 with an interior 104. A lubricant sump 106 is disposed within a lower region of housing 102 relative to gravity when rotorcraft 10 (shown in FIG. 1) is in level flight. A transmission 112 is disposed within interior 104 of housing 102 in fluid communication with lubricant sump 106. Housing 102 includes a breather port 108 and two visual inspection ports 110. Breather port 108 is a vent in gearbox housing 102 sized to relieve internal pressure and/or admit air. Visual inspection ports 110 are openings in the gearbox housing 102, sealed with respective plugs, described below, which can be removed to for visual inspection of the gears and other internal components. Prior to installation of the emergency lubrication system 101, breather port 108 existed in the housing 102 to allow insertion of a breather, and the visual inspection ports 110 existed in the housing 102 and provided visual access to the transmission 112 for use during inspection.

Some gearbox assemblies can leak lubricant from cracks that develop in the gearbox housing, holes resulting from ballistic impact, or maintenance incidents such as failure to properly reinstall the gearbox drain plug and/or other lubrication system components. These can result in lubricant loss while the gearbox is transmitting rotational energy. Some leaks can be relatively slow, leakage requiring between about ten and sixty minutes before lubricant flow from the primary lubricant flow path may be reduced. Other losses can be relatively rapid, such as pressure side leaks, leakage requiring less than ten minutes before lubricant flow from the primary lubricant flow path may be reduced. In these cases, an emergency lubrication system 101, described below, can be switched on.

With reference now to FIG. 2, an emergency lubricant reservoir 114 is in fluid communication with transmission gears 128, 136 and 130 through modified breather port 108 and through visual inspection ports 110. Gearbox assembly 100 includes three lubrication lines 116. One lubrication line 116 connects the emergency lubrication reservoir 114 to breather port 108. The other two lubrication lines 116 connect emergency lubrication reservoir 114 to respective visual inspection ports 110. Gearbox assembly 100 includes a second emergency lubricant reservoir 118 having a pump 120. Second emergency lubricant reservoir 118 is in fluid communication with the first emergency lubrication reservoir 114 so as to pump lubricant from the reservoirs 114, 118. Emergency lubrication reservoirs 114 and 118, respectively, are mounted to an accessory module 117 through respective first and second reservoir mounts, 119 and 121, respectively. While not required in all aspects, a switch controlled by a controller can control the pump to provide the lubricant. In other aspects, the controller could selectively control the pump 120 to regulate the flow of lubricant into the housing 102, such as in pulses or in a constant stream to ensure lubrication reaches the transmission gears 128, 136 and 130.

As shown in FIG. 3, visual inspection ports 110 include respective plugs 111 having jet tubes 122 therein. Jet tubes 122 direct lubricant from the emergency lubricant reservoir 114 to desired transmission components, for example, components highly sensitive to loss of lubricant. Those skilled in the art will readily appreciate that jet tubes 122 can be longer than jet tubes 122 found in breather port 108 so that the lubricant can effectively reach the desired location. Gearbox assembly 100 includes a main bevel gear mesh 126. Main bevel gear mesh 126 is at two locations on the underside of main bevel gear 128 where main bevel gear 128 meshes with respective main bevel pinions 130 which transmit torque from the input quills of respective engines. Outlets 132 of jet tubes 122 of visual inspection ports 110 are oriented toward the two locations of main bevel gear mesh 126 and their respective bearings. While described in terms of 30 minute operation and exemplary flow rates, it is understood that other flow rates and operation times can be implemented in other aspects of the invention.

Figure 4:
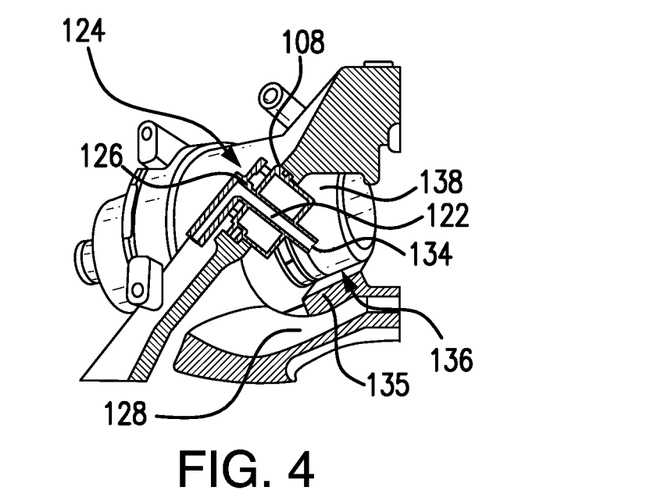
FIG. 4 is a cross-sectional side elevation view of a portion of the gearbox assembly of FIG. 1, showing an exemplary embodiment of the jet tube of the breather directed toward the tail take-off gear mesh.

With reference now to FIG. 4, breather port 108 includes a jet tube 122. Breather port 108 includes a modified breather 124 disposed therein. Modified breather 124 includes annular filter 126 surrounding jet tube 122. Gearbox assembly 100 includes a tail take-off gear mesh 136 on the topside of main bevel gear 128. Above main bevel gear 128 is a tail take-off gear 135 which meshes with tail take-off pinion 138 to form tail take-off gear mesh 136. An outlet 134 of jet tube 122 of breather port 108 is oriented toward tail take-off gear mesh 136. It is contemplated that both plugs 111 and modified breather 124 can include flanges to assist in fail-safe assembly of plugs 111 and modified breather 124 into their respective ports 110 and 108, respectively. This helps to ensure that the jet tubes 122 are consistently aligned toward the desired transmission component.

Those skilled in the art will readily appreciate that by having jet tubes at these three locations, the two locations of main bevel mesh 126 and the tail take-off mesh 136, emergency oil is provided to three critical areas that are most sensitive to loss of oil. In accordance with some embodiments, the oil flow rate is equivalent to the time required to operate without oil. For example, if the emergency lubrication reservoirs hold 1 gallon of oil, and the time required to operate is 30 minutes then the total flow rate to the critical areas must be 1 gallon/30 min or 0.033 gal./min. If there are three critical locations for emergency oil jets, then the flow rate for each of the jets is ⅓ the amount, or 0.011 gal./min.

Figure 5:
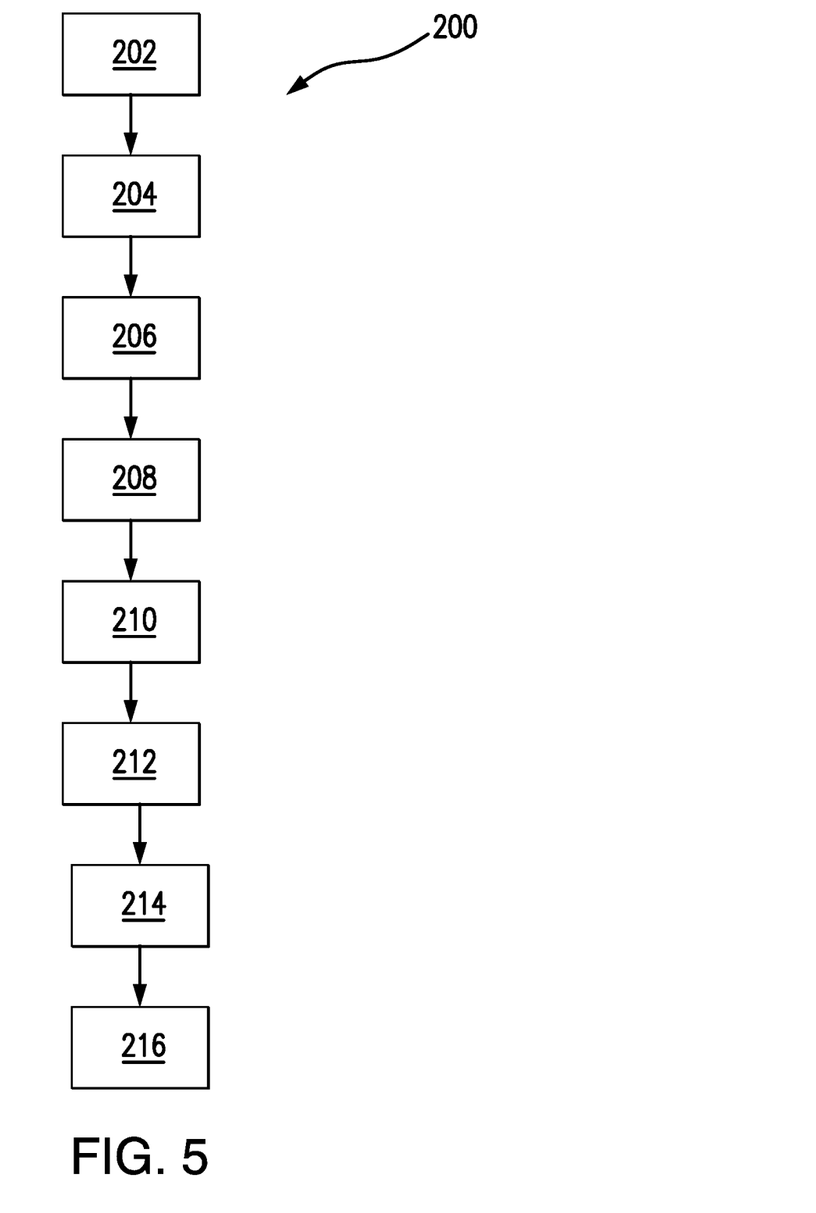
FIG. 5 is diagram of an embodiment of a method of retrofitting a gearbox assembly with an emergency lubrication system in accordance with an exemplary embodiment of the present disclosure.

As shown in FIG. 5, a method 200 of retrofitting a gear box assembly, e.g. gear box assembly 100, with an emergency lubrication system, e.g. emergency lubrication system 101, includes removing plugs from visual inspection ports, e.g. visual inspection ports 110, of a gearbox housing, e.g. a gearbox housing 102, and removing a breather from a breather port, e.g. breather port 108, of the gearbox housing, as indicated by box 202. Method 200 includes installing jet plugs, e.g. plugs 111 and modified breather 124, into the respective visual inspection ports and breather port, as indicated by box 204. The jet plugs include jet tubes, e.g. jet tubes 122. Method 200 includes orienting the jet tubes to point at desired transmission components, e.g. main bevel gear mesh 126 and/or tail take-off gear mesh 136, as indicated by box 206. While described in terms of specific ports, it is understood that other ports could have their plugs or breathers removed to the extent such other ports exist on a particular gear box assembly.

With continued reference to FIG. 5, method 200 includes removing fasteners (such as nuts and washers from screws) of an accessory module, e.g. accessory module 117, of the gear box assembly, and installing a first emergency lubrication reservoir, e.g. first emergency lubrication reservoir 114, by mating the fasteners (e.g. screws) on the accessory module with holes on a first reservoir mount, e.g. first reservoir mount 119, as indicated by box 208. Method 200 includes installing a second emergency lubrication reservoir, e.g. second emergency lubrication reservoir 118, by mating the fasteners (e.g. screws) on the accessory module with holes on a second reservoir mount, e.g. second reservoir mount 121, as indicated by box 210.

As shown in FIG. 5, method 200 includes securing the first and second emergency lubrication reservoirs onto the accessory modules and installing lubrication lines, e.g. lubrication lines 116, between the jet tubes of the breather port and inspection ports to at least one of the first and second emergency lubrication reservoirs, e.g. first and second emergency lubrication reservoirs 114, 118, as indicated by box 212. Method 200 includes securing the lubrication lines to the gearbox housing, as indicated by box 214. Method 200 includes providing power to a pump of the second emergency lubrication reservoir (e.g., wiring an AC power source 140 (FIG. 2) to pump 120 of second emergency lubrication reservoir 118, installing a switch (e.g. a switch 315) operatively connected to pump 120, and wiring an AC power source 140 to the switch) as indicated by box 216.

Figure 6:
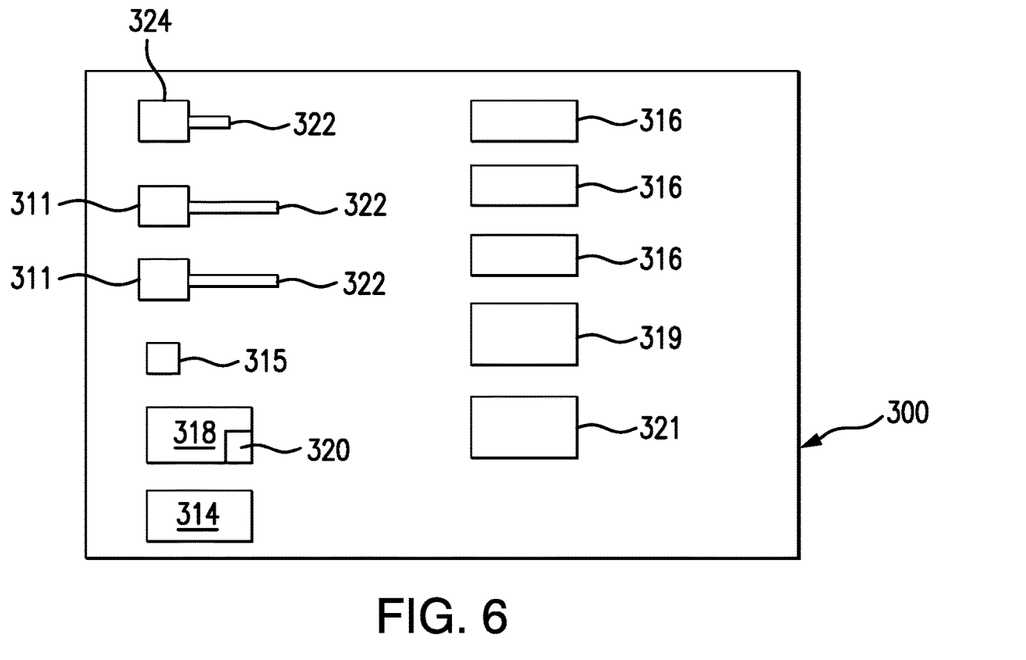
FIG. 6 is a schematic depiction of an embodiment of a field retrofit kit constructed in accordance with an exemplary embodiment of the present disclosure.

With reference now to FIG. 6, the emergency lubrication system is designed to be a field retrofit kit so that existing gearbox assemblies can be upgraded to meet the new test requirements and last 30 minutes after loss of oil from a pressurized lubrication line. Retrofit kit 300 includes a breather 324 and two plugs 311, each breather 324 and plug 311 includes a respective jet tube 322. Kit 300 includes three lubrication lines 316, a switch 315, and two emergency lubrication reservoirs 314 and 318. Emergency lubrication reservoir 318 includes a pump 320 built in. It is also contemplated that kit 300 includes first and second reservoir mounts, 319 and 321.

Embodiments of the gearbox assemblies, emergency lubrication systems, and methods of retrofitting gearbox assemblies described herein can provide a supply of lubricant sufficient for gearbox operation for more than thirty (30) minutes under hover power conditions, and longer in certain embodiments, depending on the power requirements, extending the interval of time between when the primary lubrication flow may no longer be able to provide sufficient lubricant flow to when operation of the gearbox assembly may be affected, thereby providing compliance with the certification requirements described above irrespective of how fast lubricant is lost from the gearbox assembly.

The methods and systems of the present disclosure, as described above and shown in the drawings, provide for transmissions with superior properties including improved reliability during operation in an oil-out condition. While described in the context of a rotary wing helicopter and FAA requirements, in is understood that aspects of the invention can be used which meet other requirements, and can be used in other types of machinery, including industrial machinery, automobiles, maritime machinery, locomotives, without restriction. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of retrofitting a gear box assembly with an emergency lubrication system, the gear box assembly including a gearbox housing defining a lubricant sump, an accessory module, and a transmission positioned within the gearbox housing, the method comprising:
    removing plugs from visual inspection ports of the gearbox housing;
    removing a breather from a breather port of the gearbox housing;
    installing jet plugs into the respective visual inspection ports and breather port, wherein each jet plug includes a respective jet tube; and
    securing a first emergency lubrication reservoir and a second emergency lubrication reservoir to the accessory module of the gearbox housing and fluidly coupling the first emergency lubrication reservoir with the transmission, wherein only the first emergency lubrication reservoir is coupled to the jet plugs, wherein the second emergency lubrication reservoir includes a pump, wherein during operation of the lubricant system lubricant flows from the second emergency lubrication reservoir to the first emergency lubrication reservoir to the transmission and is collected in the lubricant sump; wherein in the step of securing the first emergency lubrication reservoir and the second emergency lubrication reservoir to the accessory module of the gearbox housing, lubricant from the lubricant sump does not return to the first emergency lubrication reservoir or the second emergency lubrication reservoir.

2. The method as recited in claim 1, the step of securing the first emergency lubrication reservoir and the second emergency lubrication reservoir to the accessory module of the gearbox housing further comprising:
    installing the first emergency lubrication reservoir by mating the accessory module with a first reservoir mount;
    installing the second emergency lubrication reservoir, by mating the accessory module with a second reservoir mount;
    securing the first and second emergency lubrication reservoirs onto the accessory module; and
    installing lubrication lines between the jet tubes of the breather port and inspection ports to the first emergency lubrication reservoir.

3. The method as recited in claim 2, further comprising securing the lubrication lines to the gearbox housing.

4. The method as recited in claim 1, further comprising wiring an AC power source to the pump.

5. The method as recited in claim 1, further comprising installing a switch operatively connected to the pump, and wiring an AC power source to the switch such that the switch can operate the emergency lubrication system to provide lubricant to the transmission.

6. The method as recited in claim 1, further comprising orienting the jet tubes to point at one or more desired components of the transmission.

7. The method as recited in claim 1, wherein in the step of securing the first emergency lubrication reservoir and the second emergency lubrication reservoir to the accessory module of the gearbox housing, the second emergency lubrication reservoir is fluidly coupled to the transmission through the first emergency lubrication reservoir, wherein all the lubricant from the second emergency lubrication reservoir travels to the first emergency lubrication reservoir.

8. The method as recited in claim 1, the step of installing the jet plugs into the respective visual inspection ports and breather port further comprises installing a modified breather in the breather port, the modified breather includes an annular filter surrounding the jet tube.

* * * * *